Jan. 25, 1944.　　　　G. DUIS　　　　2,340,114
INDICATOR
Filed Jan. 24, 1942

Inventor
Glenn Duis
by Parker & Carter
Attorneys

Patented Jan. 25, 1944

2,340,114

UNITED STATES PATENT OFFICE 2,340,114

INDICATOR

Glenn Duis, Streator, Ill., assignor to Anthony Company, Streator, Ill., a corporation of Illinois Application January 24, 1942, Serial No. 428,071

4 Claims. (Cl. 235—92)

This invention relates to a recording device, and although it has other purposes, one of its purposes is to act as a recorder in connection with welding machines. The invention has, therefore, for one object, to provide means for indicating and recording the amount of time during which a welding machine is in use and is performing a welding operation. A welding machine in ordinary use is not accomplishing a weld or being used to make a weld constantly. Its operation is of necessity intermittent, and for many purposes it is desirable to provide an indication of the actual time during which the welding machine is being used or has been used to make a weld. It is therefore one of the objects of the invention to provide such a means.

Another object is to safeguard such a recording device so that it will record only actual welds and will not be operated by short circuiting or other fraudulent or deceptive means which might be used to create a false appearance of actual use.

A still further object is to provide in connection with such an indicating and recording means a printing device which will furnish a printed record which may be removed and torn off if desired.

Other objects will appear from time to time throughout the specification and claims.

This invention is illustrated more or less diagrammatically in the accompanying drawing, wherein.

Like parts are indicated by like characters throughout the specification and the drawing.

Figure 1:
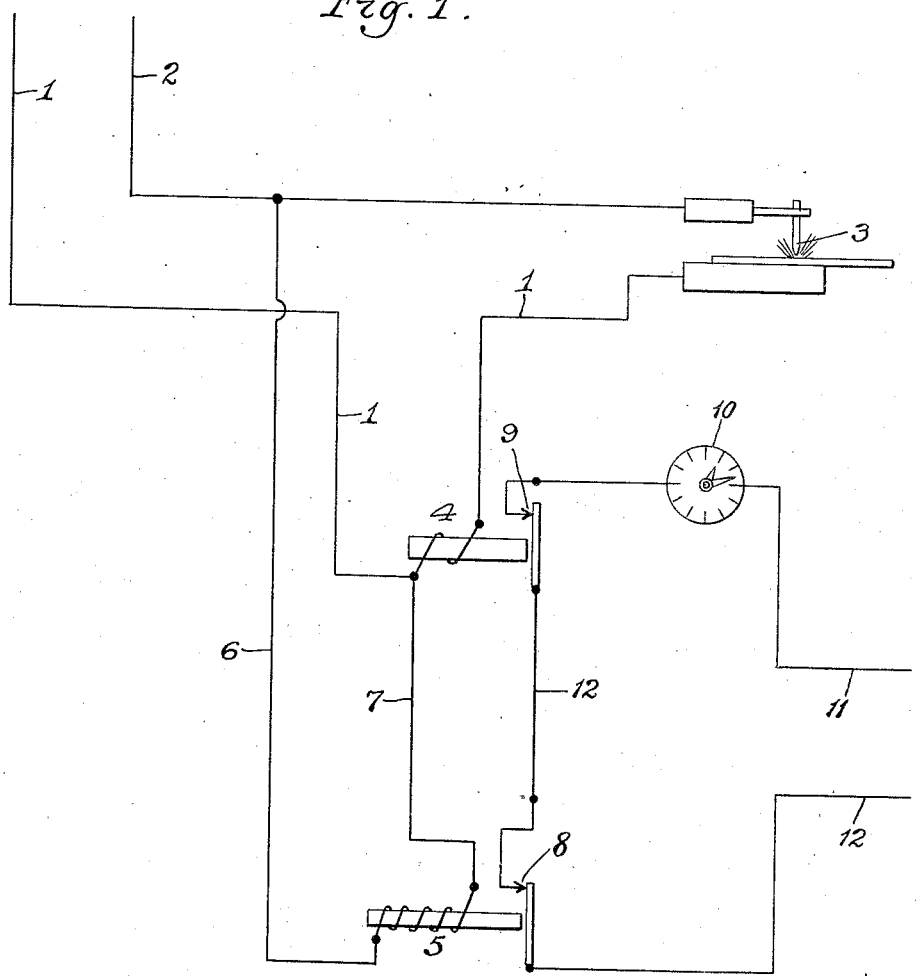
Figure 1 is a schematic showing of the device and of a circuit suitable for such a device.

As shown in Figure 1, current for welding is supplied through the wires 1 and 2. These will be connected to a generator or other source of current. The generator is not shown. The invention is adapted for use with a direct current generator and also for use with an alternating current generator, although the latter is at the present in less common use in current welding practice. The wire 2 is connected to the welding device 3, which is indicated here schematically and may be of almost any type. The wire 1 completes the welding circuit and passes about or forms the coil of a current relay 4. It may be attached to the coil of the relay or it may be shaped directly itself to form the coil. The coil of this relay is connected, as shown, in series with the current supply 1, 2.

Connected in shunt with the current supply 1, 2 is the coil of a multi-turn voltage relay 5. This relay is connected to the current supply 1, 2, by wires or conductors 6, 7. The coil 5 is effective upon the relay contact 8, which normally remains closed not only during the actual welding operation but also when welding is not in operation, so long as current is being supplied through the conductors 1, 2 of the current source.

9 is a current relay contact associated with the coil 4. 10 is an exhibiting device which may be an electric clock and which is preferably of the self-starting type. Current is supplied to this clock through wires or conductors 11 and 12. The conductor 11 is connected directly to the clock, and current which moves from the conductor 12 passes through the contact path of the voltage relay and through the contact 9 of the current relay.

Figure 2:
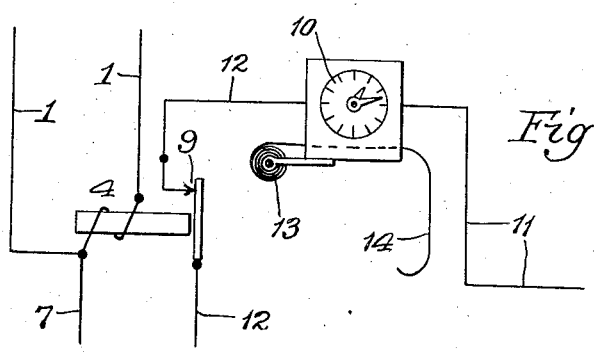
Figure 2 is a fragmentary schematic illustration of a modified form.

In the modified form of Figure 2 the parts are the same as just described, except that there is associated with the exhibiting device 10 a coil of paper or other material upon which or in which impressions may be made, and from this coil a strip 14 passes through the indicating device 10, and as it is used it is marked and it is moved out of the indicating device, which acts, in this form of the device, also as a recorder in position in which it can be read, and it may be torn off as desired. The printing mechanism is not shown as its details form no particular part in the invention. A wide variety of printing means associated with clocks and other indicators and the like now exists on the market, and many of these can be used in this installation.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawing to be taken as in a broad sense illustrative or diagrammatic, rather than as limiting me to my precise showing.

In particular, the recording mechanism or exhibiting device may be arranged in many different ways and may be of many different types. The recording mechanism or exhibiting device may be directly upon or immediately adjacent the welding instrument, or it may be placed at some other point—for example, in a central office where a supervisor can see it. For some purposes it is desirable to have the exhibiting devices of a number of welders positioned at a central point for observation or recording. Whatever the details of the exhibiting device, and whatever its location, it is preferably safeguarded against tampering and may be controlled by a special key for resetting, so that no unauthorized movement of the clock or reseetting is possible.

As has been stated above the invention may be used in connection with a direct current or with an alternating current relay. When an alternating current is used, the core of the relays should be laminated. A laminated core can also be used where direct current is used. Ordinarily, however, where direct current is used a non-laminated core is satisfactory. Except for this requirement of the cores, the apparatus as shown may be used equally well with alternating and with direct current.

The exhibiting device 10 as shown has been described as a clock. It might also include an audible or additional visual signal, such as a buzzer, bell, or light, and these devices might be used with the clock or without the clock.

No showing of housing or other mechanical parts is made herewith, as the invention is not limited to their use, and when they are specifically used, the invention is not limited to any particular form of housing or supporting or enclosing means.

The use and operation of the invention are as follows:

The operation of the form of Figure 1 is as follows: The generator is put into operation so that the current is supplied through the conductors 1 and 2. Assuming now that no welding is taking place, current passes through the relay 5 and thus the contact 8 is drawn down and it remains so, even when no welding is taking place. As soon as a weld begins, current also passes through the relay 4, and the contact 9 is drawn down. Thus the circuit through the exhibiting device is completed through the conductors 11 and 12 and through the relay contacts 8 and 9, and this circuit will remain complete as long as the welding operation continues, and will be broken as soon as the welding operation is stopped, because when that occurs, current no longer flows through the wire 1 and relay 4, and the relay contact 9 opens. This operation will occur whenever a weld takes place. The indication of the total time of welding may be given by the clock itself, which will have moved ahead only during actual welding. As above mentioned, the indication of the total time may also be taken from the printed record.

Should an operator attempt to create a false record of welding by short circuiting the welder, no indication will occur. If the welder is purposely short-circuited, the voltage of the current supply will drop to such a point that the contact 8 of the relay 5 will be broken. The short-circuiting will cause actuation of the relay 4 and will cross the circuit at the contact 9, but this is not effective to complete the circuit to the recording device 10, because the contact 8 remains open. Therefore, short-circuiting the device will not complete the circuit to the recording or exhibiting device and will not cause a false showing of a record of welding.

To recapitulate, it may be said that in normal conditions when the welding circuit is on but welding is not taking place, contact 8 remains closed. When normal welding begins, contact 9 is additionally closed, and the exhibiting device 10 is actuated. When welding is discontinued, contact 9 opens and the exhibiting device 10 stops. Upon the occurence of a deliberate short-circuit, although the contact 9 is moved to the closed position, at the same time contact 8 moves to the open position, so that the circuit to the exhibiting device 10 is not actuated, and no false record is made.

What has just been said applies also to the form of Figure 2, the contacts and the circuits being the same as that shown in Figure 1, the only difference between the two being that the form of Figure 2 includes a printing or visual record making means. The source of current for operating the recording or exhibiting device is separate from and independent of the welding circuit. It may, for example, be an ordinary lighting or back circuit.

I claim:

1. In combination for use with a welding apparatus having conductors defining an electric circuit therefor, an exhibiting device, conductors separate from the welding circuit, defining a circuit for said exhibiting device, a plurality of movable circuit breaking means adapted to control current flow through said separate circuit, electrically operated means connected to said welding circuit and adapted to operate said circuit breaking means of said separate circuit, said electrically operated means having one means under the control of the voltage in said welding circuit and being effective, during normal welding operation and during periods of inaction, to maintain one circuit breaking means closed, another of said electrically operated devices, being in series with said welding circuit and effective, during welding only, to maintain closed, in the separate circuit a second circuit breaking means.

2. In combination for use with a welding apparatus having conductors defining an electric circuit therefor, an exhibiting device, conductors separate from the welding circuit, defining a circuit for said exhibiting device, a plurality of movable circuit breaking means in said separate circuit, electrically operated means connected to said welding circuit and adapted to operate said circuit breaking means of said separate circuit, said electrically operated means having one means under the control of the voltage in said welding circuit and being effective, during normal welding operation and during periods of inaction, to maintain one circuit breaking means closed, another of said electrically operated devices, being in series with said welding circuit and effective, during welding only, to maintain closed, in the separate circuit a second circuit breaking means, the voltage requirements of said first-mentioned electrically operated means being such that upon the occurrence of a short circuit, in the welding circuit, it is rendered ineffective to close said second circuit breaking means.

3. In combination, for use with a welding apparatus having conductors defining an electric welding circuit, an exhibiting assembly including an exhibiting device and conductors defining an exhibiting assembly circuit separate from the welding circuit, a plurality of contact members in said exhibiting assembly circuit, a voltage relay adapted to close one of said contacts, and a current relay adapted to close another of said contacts, said relays being connected to the welding circuit, the voltage requirements of said voltage relay being such that, upon the occurrence of a short circuit in the welding circuit, it is rendered ineffective to close its contact device.

4. In combination, for use with a welding apparatus having conductors defining an electric welding circuit exhibiting assembly, including an exhibiting device and conductors defining an exhibiting assembly circuit separate from the welding circuit, a current relay in series in said welding circuit, and a voltage relay connected in shunt with said welding circuit, a pair of contact devices in series in said exhibiting assembly circuit, each positioned to be actuated by one of said relays, said exhibiting assembly circuit being incomplete when either of said contact devices is not in contact, the current requirements of the voltage relay being such that when the welding circuit is short-circuited, the voltage of the current supply through the welding circuit will drop to such a level that the voltage relay is not actuated.

GLENN DUIS.